United States Patent
Clements

(10) Patent No.: US 12,442,397 B2
(45) Date of Patent: Oct. 14, 2025

(54) OVERSPEED SAFEGUARDS IN HYDRAULICALLY CONTROLLED FUEL BOOST PUMP

(71) Applicant: Eaton Intelligent Power Limited, Dublin (IE)

(72) Inventor: Martin Augustine Clements, Loveland, OH (US)

(73) Assignee: Eaton Intelligent Power Limited, Dublin (IE)

( * ) Notice: Subject to any disclaimer, the term of this patent is extended or adjusted under 35 U.S.C. 154(b) by 329 days.

(21) Appl. No.: 17/826,498

(22) Filed: May 27, 2022

(65) Prior Publication Data

US 2022/0381267 A1 Dec. 1, 2022

Related U.S. Application Data

(60) Provisional application No. 63/193,857, filed on May 27, 2021.

(51) Int. Cl.
| | |
|---|---|
| *F15B 15/18* | (2006.01) |
| *F04D 13/04* | (2006.01) |
| *F04D 13/14* | (2006.01) |
| *F04D 15/00* | (2006.01) |
| *F04D 15/02* | (2006.01) |
| *F16H 39/14* | (2006.01) |

(52) U.S. Cl.
CPC ............ *F15B 15/18* (2013.01); *F04D 13/046* (2013.01); *F04D 13/14* (2013.01); *F04D 15/0066* (2013.01); *F04D 15/0218* (2013.01); *F16H 39/14* (2013.01)

(58) Field of Classification Search
CPC ........ F15B 15/18; F04D 13/046; F04D 13/14; F04D 15/0066; F04D 15/0218; F16H 39/14; F05D 2260/406; F05D 2270/021; F05D 2270/64; F02C 7/236
See application file for complete search history.

(56) References Cited

U.S. PATENT DOCUMENTS

| | | | |
|---|---|---|---|
| 11,378,018 B2* | 7/2022 | Zielinski | .................. F02C 9/28 |
| 2019/0353150 A1* | 11/2019 | Akami | .................. F04B 1/2014 |
| 2020/0256326 A1* | 8/2020 | Kharpas | .................. F04B 1/324 |
| 2021/0222711 A1* | 7/2021 | Matsuzaka | .......... F16H 61/4104 |
| 2022/0034067 A1* | 2/2022 | Itoh | ........................ F15B 11/17 |

* cited by examiner

*Primary Examiner* — Essama Omgba
*Assistant Examiner* — Lilya Pekarskaya
(74) *Attorney, Agent, or Firm* — MERCHANT & GOULD P.C.

(57) ABSTRACT

A hydraulic motor-driven fuel boost pump includes redundant safeguards against overspeeding the impellers. A flow limiter limits the amount of hydraulic fluid that can be supplied to the hydraulic motor, thereby limiting the torque that can be applied to the impellers. A control valve also transitions between a non-restrictive operating state and a restrictive operating state. In the restrictive operating state the control valve regulates the displacement of the swash plate when in the non-restrictive operating state. The control valve does not counter the bias of the swash plate control spring when in the restrictive operating state.

23 Claims, 15 Drawing Sheets

OVERSPEED SAFEGUARDS IN HYDRAULICALLY CONTROLLED FUEL BOOST PUMP

CROSS-REFERENCE TO RELATED APPLICATIONS

This application claims the benefit of U.S. Provisional Patent Application No. 63/193,857, filed May 27, 2021. The disclosure of the priority application in its entirety is hereby incorporated by reference into the present application.

BACKGROUND

Airframe fuel boost pumps deliver fuel to the aircraft engine main fuel pump to ensure peak performance of the main engine fuel pump under even adverse operating conditions. Typically, a fuel boost pump is a centrifugal pumping device including an impeller that rotates about an axis. Fuel enters the impeller along the axis. The rotation of the impeller results in a centrifugal force driving the fuel through the impeller's vanes. In certain examples, multiple impellers can drive fuel towards a manifold, which may direct the combined driven fuel towards the engine through the pump outlet port. The impellers are typically driven by an electric motor that operates at a predetermined speed.

SUMMARY

Some aspects of the disclosure are directed to a hydraulic system including a pump, a hydraulic motor, and a control valve that regulates the amount of hydraulic fluid supplied to the hydraulic motor and the position of the swash plate within the motor.

In certain implementations, the hydraulic system includes a hydraulic flow limiter that functions as a primary safeguard against overspeeding of the pump. In certain implementations, the hydraulic system also includes a control valve that functions as a redundant safeguard against overspeeding. In certain examples, the control valve is downstream of the limiter and restricts less flow than the limiter. In certain examples, the control valve transitions to a restrictive operating mode only upon failure of the limiter.

In certain implementations, the control valve includes a spool being linearly moveable to transition the control valve between a first operating state and a second operating state. The control valve defines a flow path between a fluid supply port and a fluid outlet port at a spool bore. The flow path is non-restrictive when the control valve is in the first operating state. The flow path is restrictive when the control valve is in the second operating state.

In certain implementations, the control valve includes a spool actuation piston operatively coupled to the first end to the spool for forcing the spool in a first direction in response to pressure corresponding to the outlet of the pump being applied to the spool actuation piston. The control valve also includes a spring operatively coupled to the second end of the spool for biasing the spool in a second direction opposite from the first direction. The control valve transitions between the first and second operating states based on a direction of a net force applied to the spool by the spool actuation piston and the spring.

In certain implementations, the control valve includes a valve body defining a fluid supply port and a fluid outlet port in fluid communication with a spool bore. The fluid supply port connects to a fluid supply and the fluid outlet port connects to the hydraulic motor to provide fluid for driving rotation of a rotating group of the hydraulic motor.

In certain implementations, the control valve includes a spool positioned within the spool bore to move linearly along a range of travel between first and second positions. The spool is configured to open a non-restrictive flow path within the spool bore between the fluid supply port and the fluid outlet port when the control valve is in a non-restrictive operating state. The control valve defines a restrictive flow area through which hydraulic fluid from the fluid supply port is required to pass to reach the fluid outlet port when control valve in a restrictive operating state. The control valve is in the restrictive operating state when the spool is disposed in the second position. The control valve is in the non-restrictive operating state when the spool is disposed in the first position and in many of the intermediate positions between the first and second positions. In certain examples, the control valve is configured in a transitory operating state when the spool is disposed between the non-restrictive operating state positions and the second position.

In certain implementations, when the outlet pressure of the pump is at or above the normal operating pressure, the outlet pressure piston maintains the control valve in the non-restrictive operating state. When the outlet pressure of the pump drops below the normal operating pressure, the spring moves the spool of the control valve in the second direction along the axis of the spool bore to a position corresponding to the restrictive operating state.

In certain implementations, the valve body defines a motor control port for providing pressure to a control piston for moving a swash plate to destroke the hydraulic motor. When the outlet pressure of the fuel pump exceeds the normal operating pressure, the outlet pressure piston moves the spool valve in the first direction to a position in which the motor control port is in fluid communication with the fluid supply port.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to various overspeed safeguards for use when a fuel boost pump is driven by a hydraulic motor instead of an electric motor.

Figure 1:
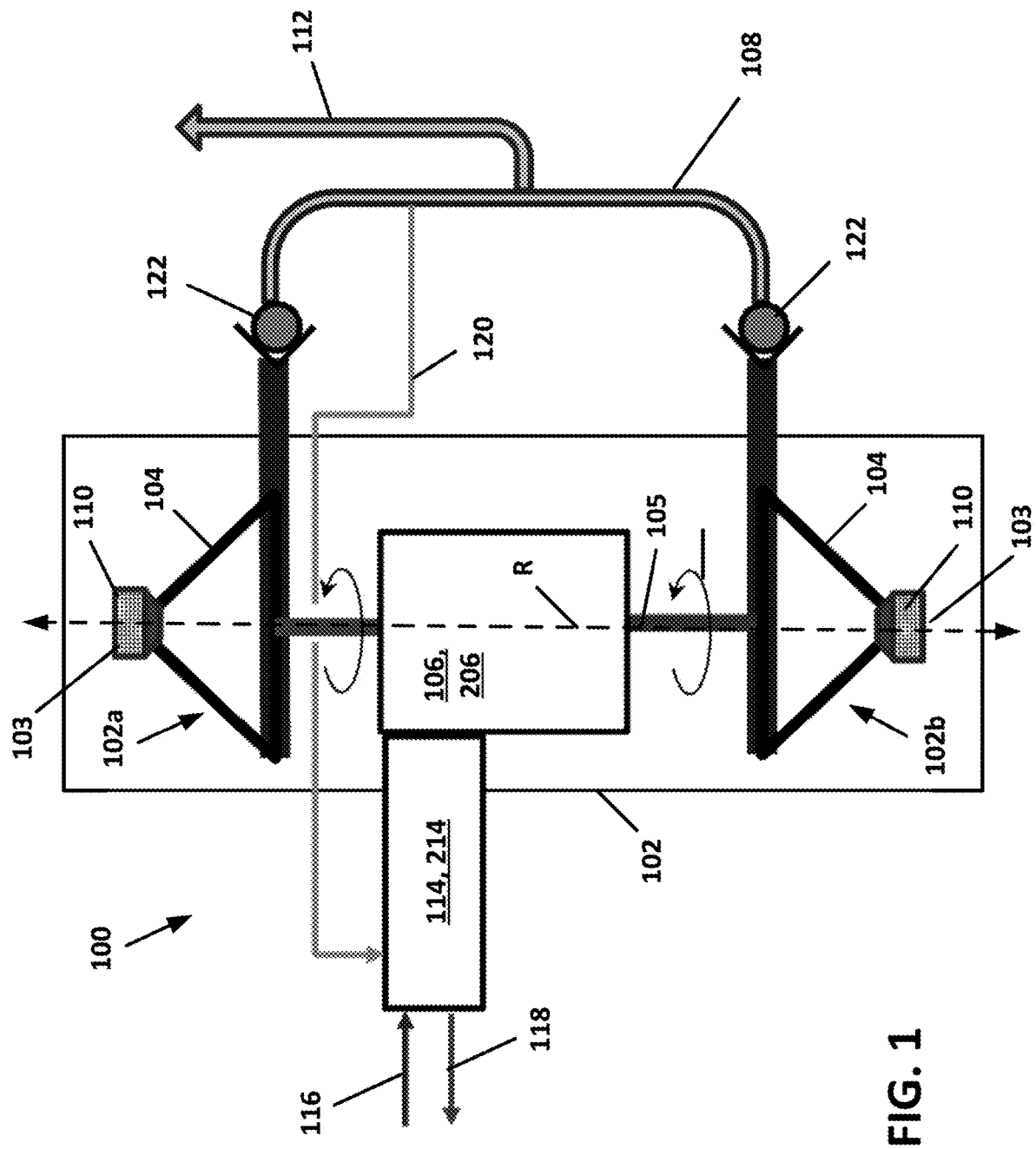
FIG. 1 is a schematic diagram of a hydraulic motor driven fuel boost pump including a control unit configured in accordance with the principles of the present disclosure.

FIG. 1 is a control schematic for a hydraulic motor driven fuel boost pump for a vehicle, such as an aircraft. The system 100 includes a pump arrangement 102 including one or more pumps each having an impeller 104 that is rotatable about an axis R. When rotating, each impeller 104 draws a fuel (e.g., see fluid lines F in FIG. 2) into a pump inlet 103 from a fuel supply and drives the fuel towards a pump outlet 112 that leads to an engine. For example, the fuel may be drawn through an inlet screen 110 along the rotational axis R of the impeller 104. The fuel driven by the impeller 104 may pass through a check valve 122 (e.g., a flapper check valve) toward the pump outlet 112.

In the example shown, the pump arrangement 102 includes a first fuel pump 102a and a second fuel pump 102b. In certain examples, the pumps 102a, 102b are aligned along an output shaft 105 of a motor 106, 206. In other examples, the pump arrangement 102 can have a greater or lesser number of fuel pumps (e.g., one pump, three pumps, four pumps, etc.). Each of the pumps 102a, 102b outputs to a manifold 108 at which the output fuel is combined and directed towards the pump outlet 112.

Figure 2:
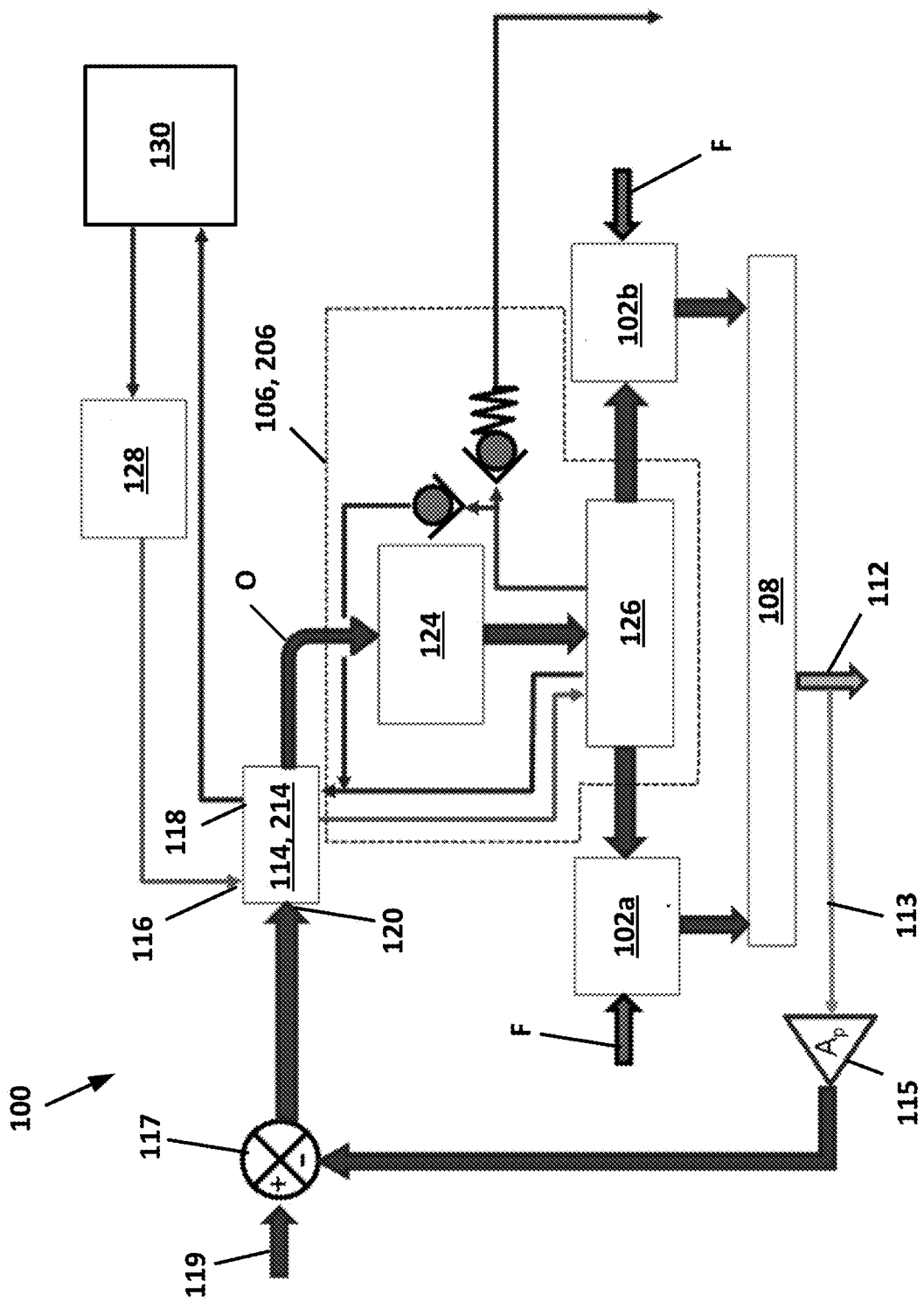
FIG. 2 illustrates a control scheme for the hydraulic motor driven fuel boost pump of FIG. 1.

A hydraulic motor 106, 206 is operationally coupled to each pump 102a, 102b to drive the rotation of each impeller 104 using a hydraulic fluid (e.g., oil). For example, the hydraulic motor 106, 206 may have an output shaft 105 to which the impeller 104 is mounted. In certain implementations, the hydraulic motor 106, 206 is a variable displacement hydraulic motor configured to spin the impeller 104 at such a speed as to produce a predetermined amount of pump outlet pressure regardless of the fuel flow delivered from the pump arrangement 102. As shown in FIG. 2, the hydraulic motor 106, 206 includes a motor rotating group 126 that rotates the motor output shaft 105 and a swash plate 124 that regulates the amount of hydraulic flow (and hence torque) applied to the motor rotating group 126.

The hydraulic motor 106, 206 is controlled via a hydro-mechanical control valve unit 114, 214, respectively. The control valve unit 114, 214 has a first inlet 116 receiving a high pressure line carrying the hydraulic fluid from a hydraulic system 130 of the vehicle and a return outlet emptying back to the hydraulic system 130 of the vehicle (i.e., back to tank). In certain examples, a hydraulic flow limiter 128 is disposed along the high pressure line upstream of the first inlet 116. The hydraulic flow limiter 128 restricts the amount of hydraulic fluid that flows to the control unit 114, 214 and, hence, to the rotating group 126 of the hydraulic motor 106, 206. Details of an example hydraulic flow limiter 128 will be discussed in more detail herein.

The control valve unit 114, 214 also has a second inlet 120 receiving a pump discharge fuel pressure (e.g., a portion of the driven fuel from the manifold 108 or the pump outlet line 112). The control unit 114, 214 manages the displacement of the swash plate 124 using a control output O (FIG. 2), which is produced based on the pump discharge fuel pressure as will be disclosed in more detail herein. The control unit 114, 214 also provides a second point of restriction on the hydraulic fluid supplied to the rotating group 126 of the hydraulic motor 106, 206. Accordingly, in some implementations, the control unit 114, 214 provides a redundant safeguard against overspeeding of the pump impeller(s) 104 in the event the hydraulic flow limiter 128 fails (e.g., due to silting). In certain examples, the control unit 114, 214 provides less of a restriction then the limiter 128. In an example, the limiter 128 restricts 125% of the fluid that the control unit 114, 214 restricts. In other implementations, the control unit 114, 214 provides the primary or only safeguard against overspeeding of the impellers 104.

The control valve unit 114, 214 includes a valve body 132, 232 holding a spool 134, 234 that is linearly moveable along a spool axis S1, S2 within a spool bore 136, 236, respectively, along a range of travel between restrictive and non-restrictive operating states. The valve body 132, 232 defines a hydraulic fluid supply inlet port 138, 238 leading to the spool bore 136, 236 from the hydraulic flow limiter 128. The valve body 132, 232 also defines a motor supply outlet port 140, 240 leading from the spool bore 136, 236 to the rotating group 126 of the hydraulic motor 106, 206. In certain implementations, a first end of the spool 134, 234 is coupled to an outlet pressure piston 150, 250 and an opposite second end of the spool 134, 234 is spring biased by a spring member 152, 252 (e.g., a coil spring). The spring member 152, 252 is compressed between the second end of the spool 134, 234 and a spring stop 166, 266.

The control valve 114, 214 is operable for providing flow between the fluid supply port 138, 238 and the fluid outlet port 140, 240 in a restrictive flow state and a non-restrictive flow state. In the restrictive flow state, the control valve 114, 214 limits the amount of fluid and pressure provided to the rotating group 126 of the hydraulic motor 106, 206. Restricting the amount of fluid and pressure provided to the rotating group 126 limits the torque applied to the drive shaft 105 and, hence, to the impeller(s) 104 of the pump arrangement 102. Accordingly, configuring the control valve 114, 214 in the restrictive flow state inhibits overspeeding of the impellers 104 of the pump 102 during a dry run condition of the pump 102.

The restrictive flow state can correspond to the spool 134, 234 being located at a specific position in the spool bore 136, 236 with the position being defined by a positive stop 148, 203 engaged by the spool 134, 234. The non-restrictive flow state can correspond to a range of positions of the spool 134, 234 within the spool bore 136, 236. The spool 134, 234 can be configured to transition the control valve 114, 214 between the restrictive flow state and the non-restrictive flow state by axial movement of the spool 134, 234 within the spool bore 136, 236 and thus the control valve 114, 214 also can be in a transitional state.

Figure 10:
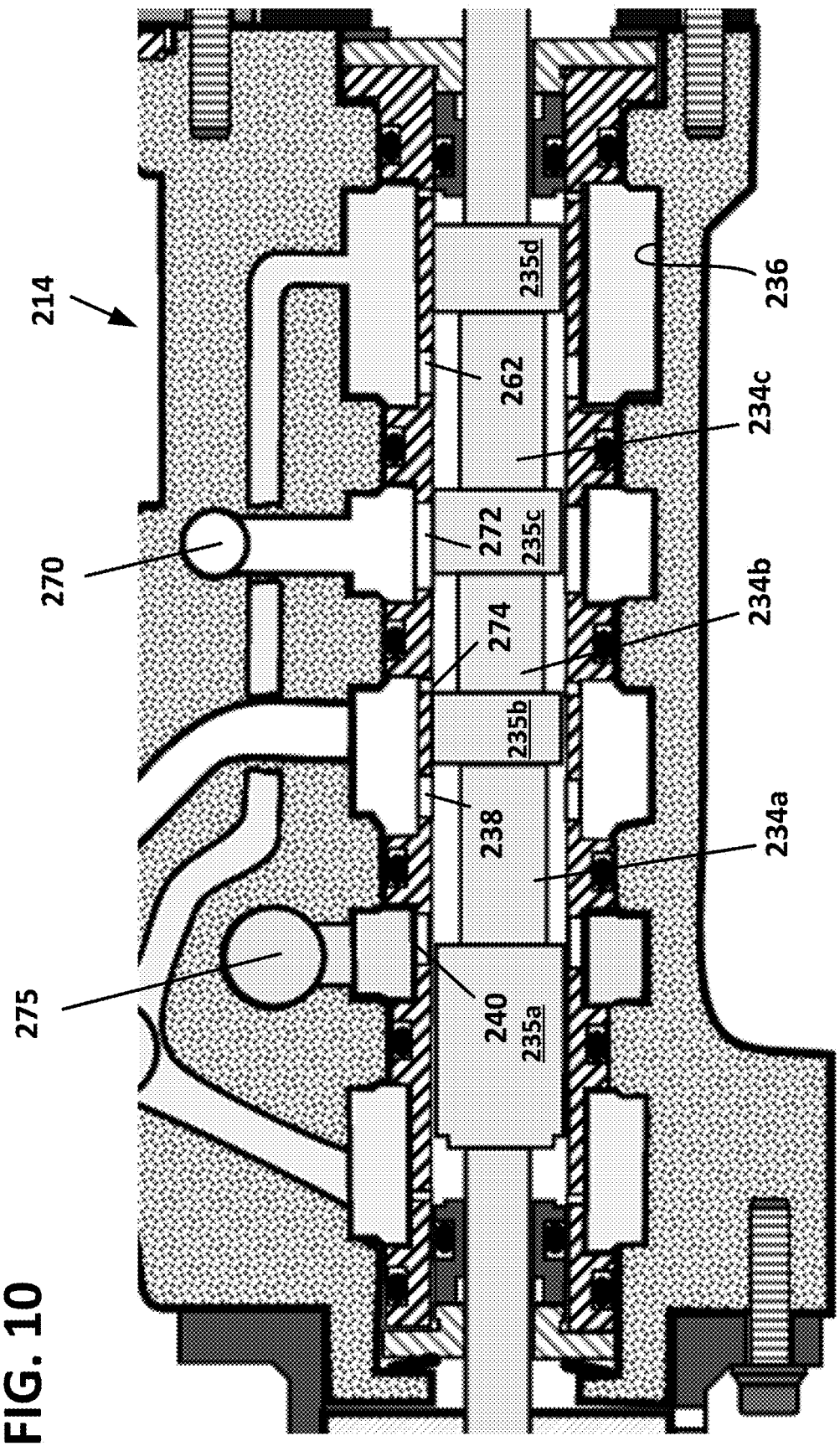
FIG. 10 shows the control valve of FIG. 8 configured in a non-restrictive operating state where fluid from the supply inlet is flowing to the swash plate controls in the motor.

When operating in the non-restrictive flow state, the fuel pressure output by the fuel pump 102 can be regulated so as to be maintained at a desired fuel pressure by adjustment of the displacement of the hydraulic motor 106, 206 (e.g., by adjusting a position of the swash plate 124 to stroke or de-stroke the hydraulic motor 106, 206). The displacement of the hydraulic motor 106, 206 can be coordinated with the positioning of the spool 134, 234 while the valve 114, 214 is in the non-restrictive flow state. For example, if the fuel pressure output by the fuel pump 102 exceeds the desired fuel pressure while the control valve 114, 214 is operating in the non-restrictive flow state, the spool 134, 234 can move to a position in which the system pressure is placed in fluid communication with the a cylinder 182 of a swash plate position controller 180 causing a swash plate piston 184 of the position controller 180 to move the swash plate 124 away from a maximum pump displacement position toward a minimum pump displacement position such that the displacement of the pump 102 is reduced (e.g., see FIG. 10). The swash plate 124 can be spring biased toward the maximum displacement position. If the fuel pressure output by the fuel pump 102 equals or is less than the desired fuel pressure while the control valve 114, 214 is operating in the non-restrictive flow state, the spool 134, 234 can move to a position in which the system return pressure is placed in fluid communication with the cylinder 182 of a swash plate position controller 180 such that insufficient pressure is provided to overcome the spring pressure biasing the swash plate 124 toward the maximum displacement position so that the swash plate 124 remains in the maximum displacement position (e.g., see FIG. 11).

Figure 3:
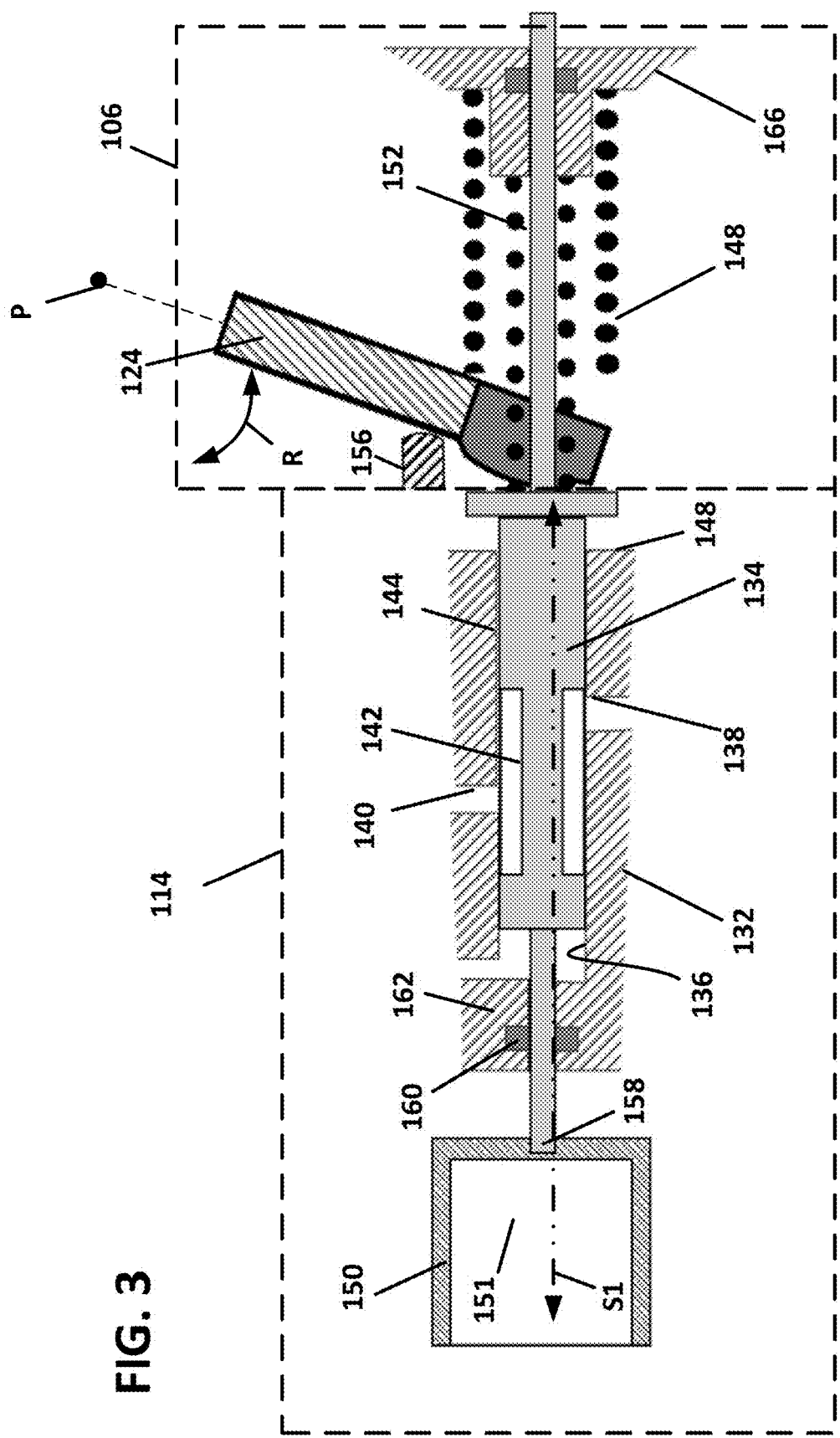
FIG. 3 illustrates a first example implementation of the hydraulic motor and control valve unit of FIG. 1 with the control valve unit configured in the non-restrictive operating state and a swash plate disposed in a displaced position.
Figure 4:
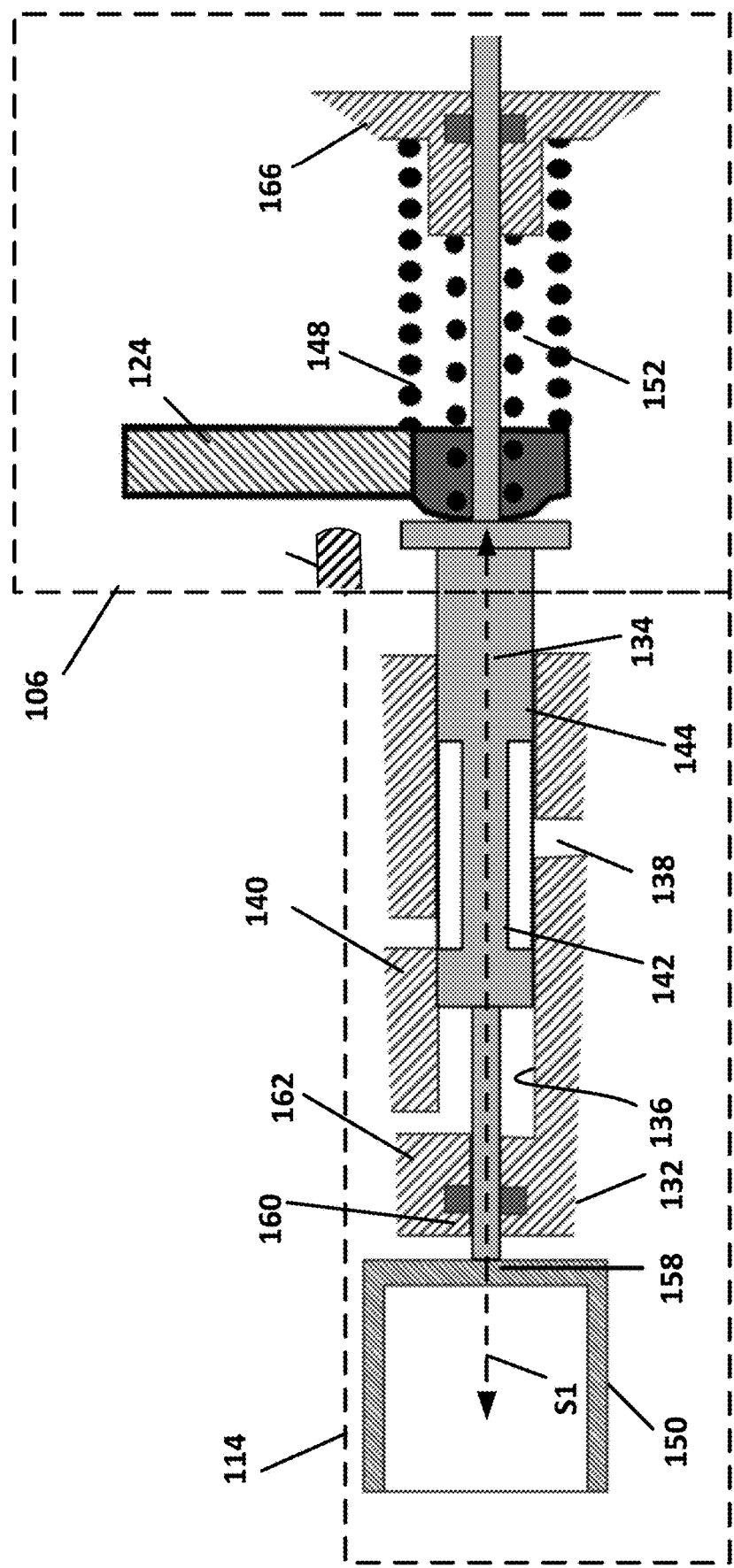
FIG. 4 shows the control valve unit of FIG. 3 still disposed in the non-restrictive operating state, but biasing the swash plate to a zero displacement position.

In an alternative example, if the fuel pressure output by the fuel pump 102 exceeds the desired fuel pressure while the control valve 114, 214 is operating in the non-restrictive flow state, the spool 134, 234 can move to a position in which the spool 134, 234 mechanically transfers force to the swash plate 124, 224 causing the swash plate 124, 224 to move away from a maximum pump displacement position toward a minimum pump displacement position such that the displacement of the pump 102 is reduced (e.g., see FIG. 4). The swash plate 124, 224 in this example is spring biased toward the maximum displacement position. If the fuel pressure output by the fuel pump 102 equals or is less than the desired fuel pressure while the control valve 114, 214 is operating in the non-restrictive flow state, the spool 134, 234 can move to a position in which the spool 134, 234 does not transfer sufficient force to the swash plate 124 to overcome the spring pressure biasing the swash plate 124 toward the maximum displacement position so that the swash plate 124 remains in the maximum displacement position (e.g., see FIGS. 3 and 15).

In one example, the flow path through the control valve 114, 214 between the fluid supply port 138, 238 and the fluid outlet port 140, 240 is non-restrictive when the pressure drop across the flow path is less than 5 percent of the normal operating pressure when the system is operated at the normal operating pressure. For example, in a case in which the system is operated at a normal operating pressure of 3800 pounds per square inch (psi) the pressure drop across the flow path when the flow path is non-restrictive is less than 190 psi. Preferably, the pressure drop is significantly less than 5 percent.

In one example, the flow path through the control valve 114, 214 between the fluid supply port 138, 238 and the fluid outlet port 140, 240 is restrictive when the pressure drop across the flow path at least 75 percent of the normal operating pressure when the system is operated at the normal operating pressure. For example, in a case in which the system is operated at a normal operating pressure of 3800 pounds per square inch (psi) the pressure drop across the flow path when the flow path is restrictive is at least 2850 psi. In certain examples, the pressure drop across the restrictive flow path can be at least 80 percent or at least 90 percent of the normal operating pressure.

In certain implementations, the restrictive flow area through which fluid is required to pass within the control valve unit 114, 214 between the fluid supply port 138, 238 and the fluid outlet port 140, 240 can be selected in coordination with a flow area defined by the flow limiter valve 128 when the flow limiter valve 128 is operating properly. In one example, the restrictive flow area defined by the control valve 114, 214 is less restrictive than the flow area defined by the flow limiter valve 128 when the flow limiter valve 128 is properly limiting flow. In one example, the restrictive flow area of the control valve 114, 214 is selected such that a pressure drop across the restriction provides a pressure to the hydraulic motor 106, 206 from the outlet port 140, 240 that matches the return pressure of the system (e.g., so that there is zero pressure delta across the hydraulic motor 106, 206) at a first flow rate when system pressure is provided to the supply port 138, 238. The first flow rate can be 15-35 percent larger or 20-30 percent larger than a second flow rate at which the flow limiter 128 generates a pressure drop that reduces the system pressure to match the return pressure of the system. For example, in an example system having a system pressure of 3800 psi and a return pressure of 200 psi, when operating properly the flow limiter 128 applies a restriction that would result in a pressure drop of 3600 pounds per square inch differential (psid) at a flow of 6.4 gallons per minute (gpm) while the restrictive flow area set by the spool 134, 234 will provide a pressure drop of 3600 psid at a flow of 8.1 gpm.

In certain implementations, the restrictive flow area established by the control valve 114, 214 is preferably selected to be sufficiently small such that the pressure provided to the motor 106, 206 from the control valve 114, 214 drives the hydraulic motor 106, 206 at speed limited to a safe speed (e.g., no more than 25 percent higher than a maximum speed rating for the motor 106, 206) when the fuel pump 102 is spinning dry (i.e., no fuel is being pumped through the fuel pump 102 perhaps because the fuel tank is empty). The restrictive flow area established by the control valve 114, 214 is preferably selected to be sufficiently large such that upon start-up of the system under conditions in which the fuel pump is not dry (i.e., fuel is present at the inlet 103 of the fuel pump 102), the pressure provided to the motor 106, 206 is sufficiently large to drive the motor 106, 206 at a speed/torque high enough for the outlet pressure of the fuel pump 102 to raise to a level in which the control valve 114, 214 transitions from the restrictive operating state to the non-restrictive operating state.

In certain implementations, the size of the restrictive flow area is selected based on a normal operating pressure of the fluid supply 138, 238 and an amount of pressure drop required across the restrictive flow area required to provide the hydraulic motor 106, 206 with a limited motor drive pressure suitable for driving the hydraulic motor 106, 206 at a safe speed even when the fuel pump arrangement 102 is running dry.

In certain examples, the limited motor drive pressure is selected such that the torque provided by the hydraulic motor 106, 206 at maximum displacement when driven at the safe speed by the limited motor drive pressure is torque balanced by the windage loss of the fuel pump arrangement 102. In certain examples, the safe speed is no more than 125% of the rated maximum speed for the pump.

The spool 134, 234 translates within a spool bore 136, 236 along a spool axis S1, S2 as pressure applied to the outlet pressure piston 150, 250 overcomes the force of the spring member 152, 252. The outlet pressure piston 150, 250 is configured to move linearly within a piston chamber 253 (e.g., see FIG. 7). In certain examples, the piston chamber 253 aligns with the spool axis S1, S2. A tap line 113 from the pump output 112 feeds into the outlet pressure piston 150, 250 through the second inlet 120, 220 of the control unit 114, 214. The spring force of the spring member 152, 252 is set to balance against a predetermined amount of pressure (e.g., a desired amount of pressure) from the output 112 of the pump arrangement 102. For example, the spring force can be balanced against a multiple of the desired fuel pressure and the area of the contact surface 151, 251 (FIGS. 3 and 7) of the outlet pressure piston 150, 250. This relationship is illustrated in FIG. 2 which shows a control gain function 115 multiplying the fuel pressure by the area Ap of the outlet pressure piston contact surface 151, 251. FIG. 2 also shows an opposing spring force 119 summed (e.g., see symbol 117) against the output of the control gain function 115 to determine the linear movement of the spool 134, 234.

As the output pressure of the pump arrangement 102 decreases (e.g., based on reduced availability of the fuel to the pump arrangement 102), the spring member 152, 252 biases the spool 134, 234 towards the restrictive position in which only a minimum amount of hydraulic fluid is supplied to the motor rotating group 126, thereby reducing the amount of torque applied to the pump impeller(s) 104 until the fuel flow returns to at least a predetermined amount of pressure. Alternatively, when the pump output levels exceed the predetermined amount of pressure, the outlet pressure piston 150, 250 presses the spool 134, 234 to a position in which hydraulic fluid flow to the motor rotating group 126 remains non-restrictive, but the swash plate 124 is destroked. is restrictive.

Figure 5:
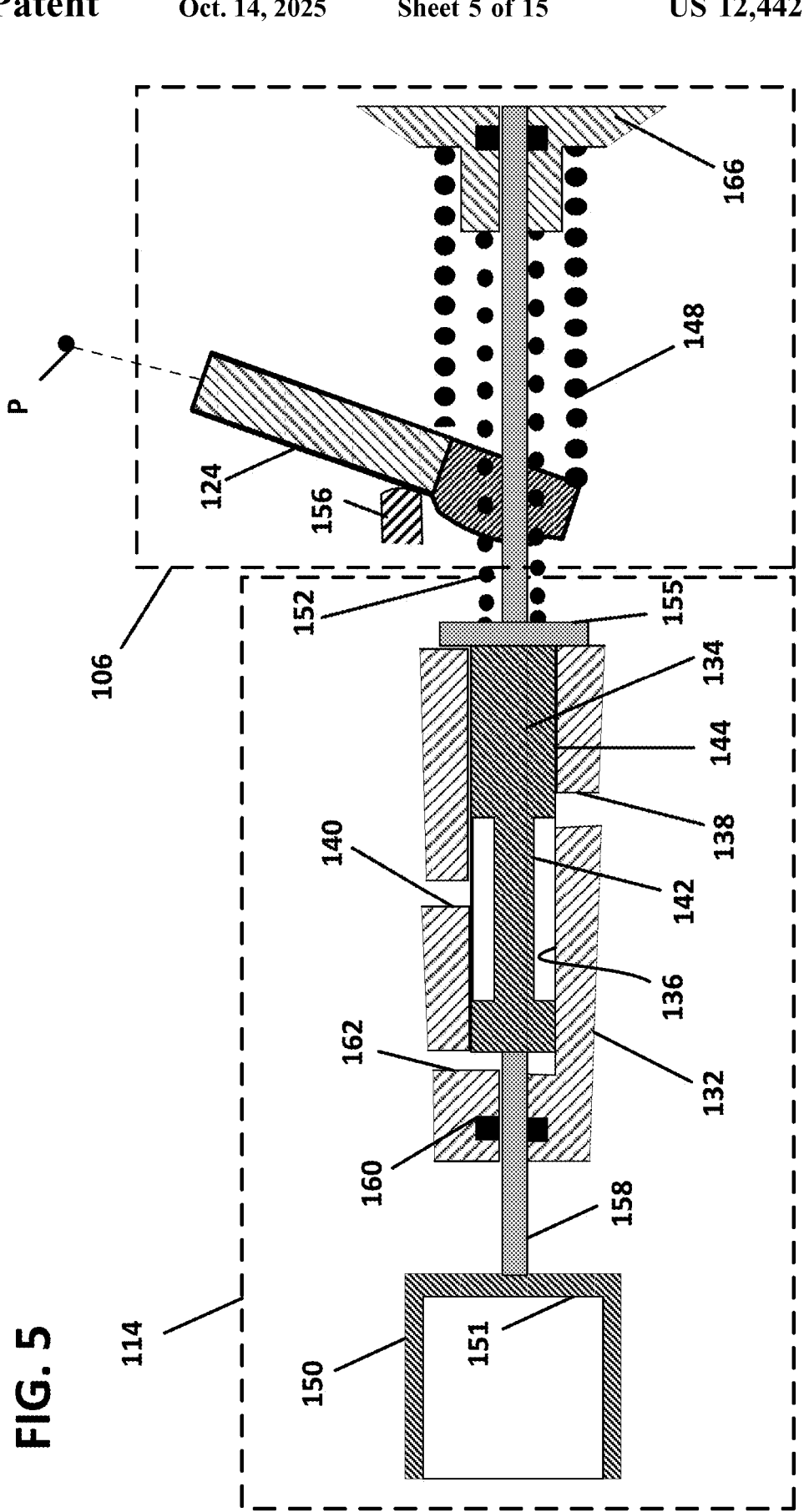
FIG. 5 shows the control valve unit of FIG. 3 disposed in a restrictive operating state while the swash plate is disposed in a maximum displacement position.

FIGS. 3-5 illustrate a first example implementation of the control unit 114 configured to manage displacement of the swash plate 124 and/or fluid supply to the rotating group 126 of a first example implementation of a hydraulic motor 106 (partially shown). In the example shown, the spool 134 includes a groove 142 between two lands 144. The spool 134 allows unrestrictive flow between the supply inlet port 138 and the motor outlet port 140 when the groove 142 aligns with both. Fluid flow is restrictive when the land 144 aligns with one of the supply inlet port 138 and the motor outlet port 140. In the example shown in FIG. 5, the land 144 partially extends across the fluid supply inlet port 138.

In certain implementations, a stop member 155 coupled to the spool 134 provides a positive stop against the valve spool body 132 when the spool 134 reaches the restrictive position. The positive stop inhibits movement of the spool 134 under the bias of the spring 152 beyond the restrictive position (even in the absence of fuel pressure). The positive stop 155 also prevents the spool 134 from moving to a position where the land 144 fully blocks the supply inlet port 138. Hydraulic fluid can flow to the motor 106 through the restrictive area even when the spool 134 is disposed in the second position.

Providing at least some fluid flow to the motor outlet 140 (or a separate motor outlet) allows the control unit 114 to initially start the motor 106 with the spool valve 134 in the restrictive position. Further, the restrictive flow area is large enough to allow the hydraulic motor 106 to be re-started after an event in which fluid flow to the fluid supply port 138 stops.

Figure 6:
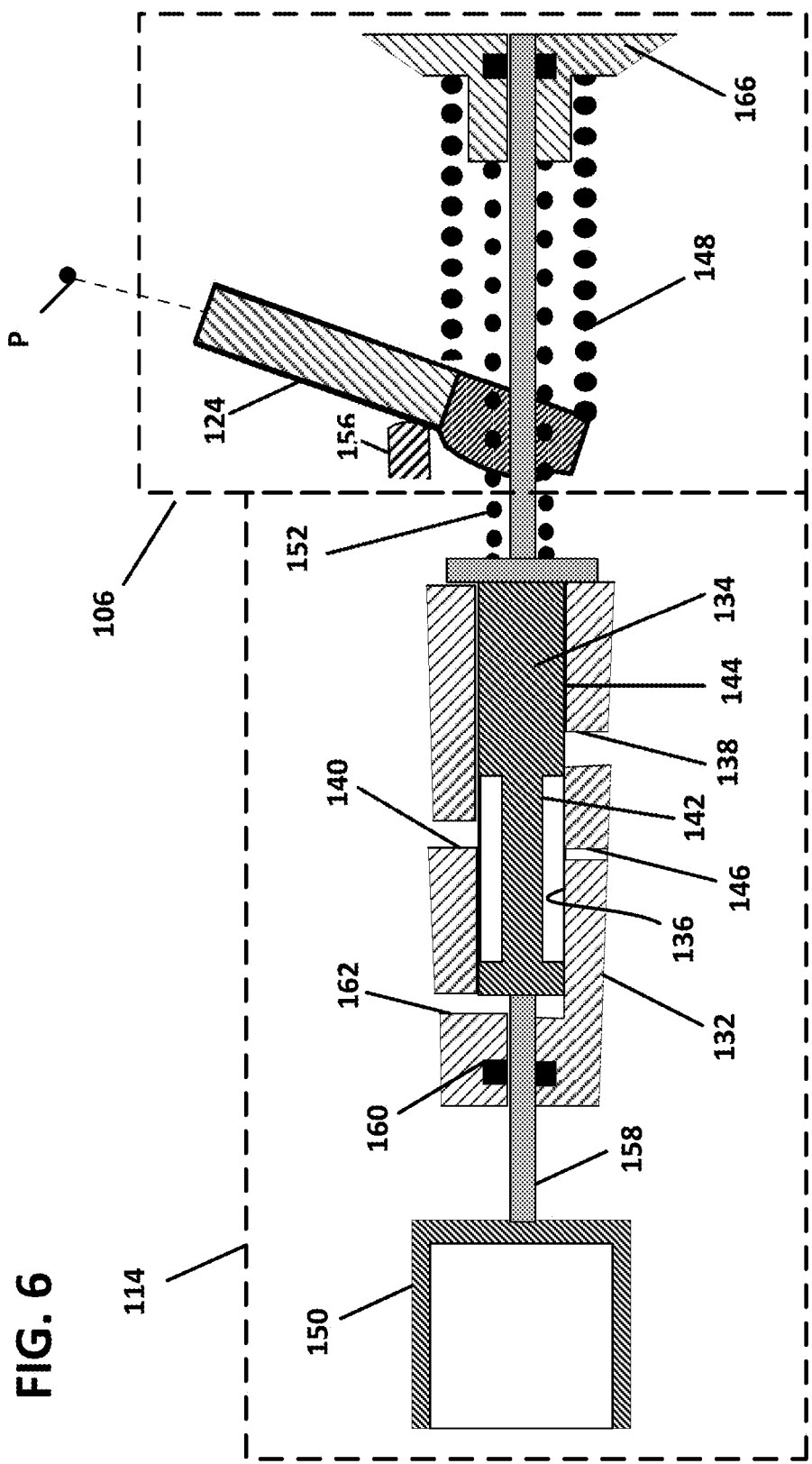
FIG. 6 shows another example of control valve unit the spool of FIG. 5, but where the restrictive flow is provided through a separate, smaller supply inlet.

FIG. 6 illustrates an alternative implementation of the control unit where the valve body 132 defines a second supply inlet 146 that is separate from the supply inlet port 138. The second supply inlet 146 is smaller than the supply inlet port 138. When the spool 134 of FIG. 6 is disposed in the restrictive position, the land 144 of the spool 134 fully blocks the supply inlet port 138, but does not block the second supply inlet 146. The second supply inlet 146 is sized to allow a restrictive amount of hydraulic fluid to pass to the motor outlet port 140. Alternatively, the valve body 132 defines a second, smaller motor outlet if the spool 134 would block the motor outlet port 140 in the restrictive position.

Providing at least some fluid flow to the motor outlet port 140 (or separate motor outlet) allows the control unit 114 to initially start the motor 106. During start-up, the pump arrangement 102 would not be running and so the pump output 112 would not overcome the balance of the spring 152. Accordingly, the spool 134 would be disposed in the restrictive position. Hydraulic fluid can flow to the motor 106 through the restriction even when the spool 134 is disposed in the restrictive position, thereby allowing the motor 106 to start. Further, the restrictive flow area is large enough to allow the hydraulic motor 160 to be re-started after an event in which fluid flow to the fluid supply port 138 stops.

Referring back to FIGS. 3-5, in certain implementations, the swash plate 124 is configured to move (e.g., pivot or rotate) about an axis P between a zero displacement positon and a maximum displacement position. The swash plate 124 is biased towards a maximum displacement position by a spring 148 (e.g., a coil spring). A stop 156 inhibits movement of the swash plate 124 beyond the maximum displacement position.

The second end of the spool 134 is configured to adjust the displacement of the swash plate 124 as the spool 134 travels towards and away from the restrictive position. In the non-restrictive operation example shown in FIG. 3, the second end of the spool 134 contacts the swash plate 124, but has not countered the bias of the spring 148. Accordingly, the spring 148 biases the swash plate 124 to or near the maximum displacement position.

As greater pressure is applied to the outlet pressure piston 150, the spool 134 moves away from the restrictive position and eventually contacts the swash plate 124. Continued movement of the spool 134 away from the restrictive position acts against the bias of the spring 148 and begins moving the swash plate 124 towards a zero displacement position. When the pump output 112 exceeds the predetermined amount of output pressure (or exceeds a second, higher predetermined threshold), the outlet pressure piston 150 drives the spool 134 to a position along the range of travel opposite the restrictive position (e.g., see FIG. 4). When in the opposite position, the spool 134 presses the swash plate 124 to the zero displacement position so that torque is not applied to the rotating group 126 (or only a minimal amount of torque is applied).

In the example shown in FIGS. 3-6, the spool 134 is connected to the outlet pressure piston 150 via a rod 158. The rod extends through a seal 160 (e.g., a gasket) at the valve body 132 to reach the outlet pressure piston 150. In certain implementations, the valve body 132 also defines a return outlet 162. As the pump output pressure decreases, the spool 134 pushes low pressure hydraulic fluid to tank (e.g., via outlet 118 shown in FIG. 2). As the pump output pressure increases, the spool 134 draws the low pressure fluid into the spool bore 136.

Figure 14:
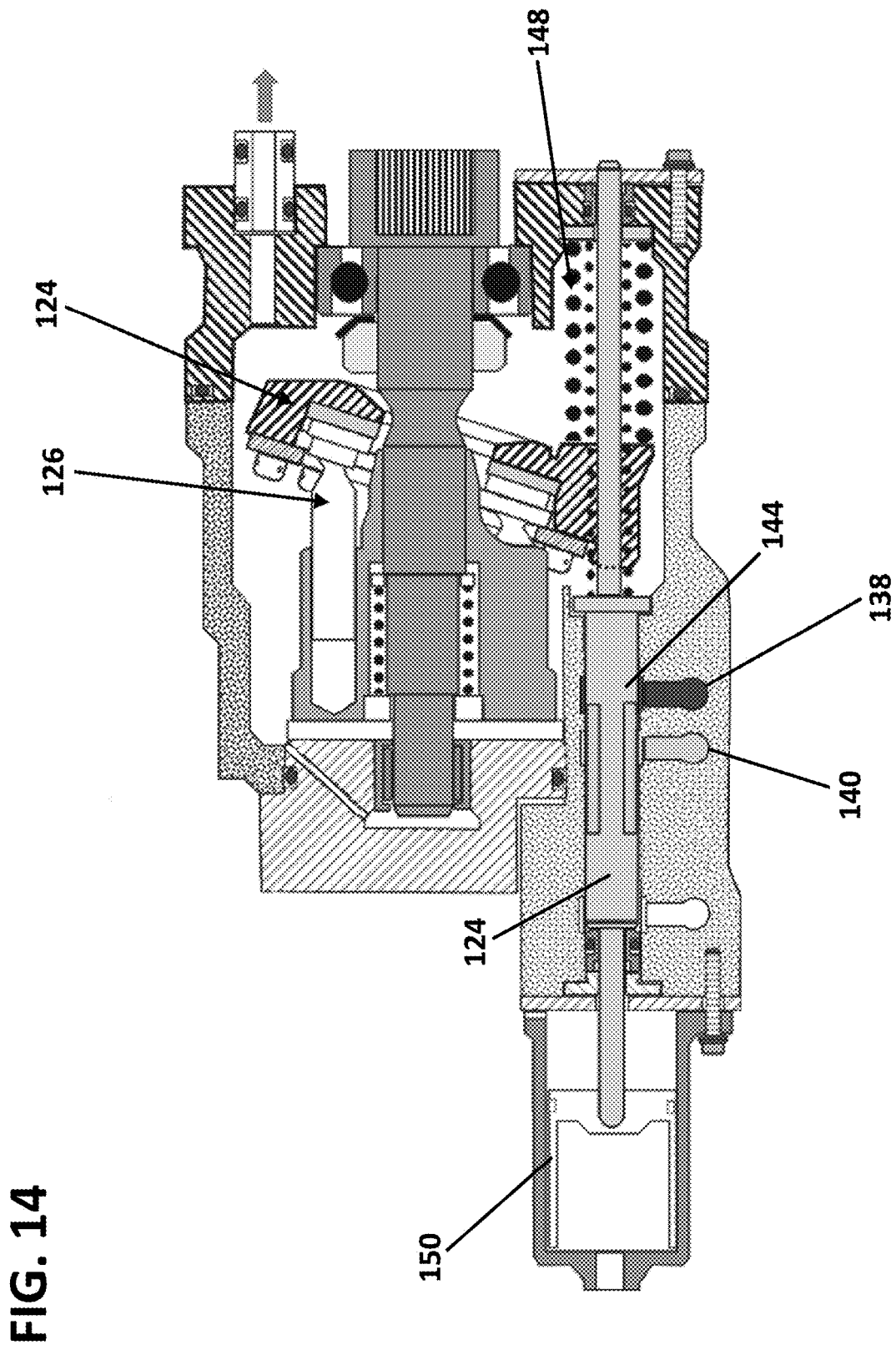
FIG. 14 illustrates an example implementations of the hydraulic motor and control valve unit of FIG. 3, the control valve unit shown in the restrictive operating state.
Figure 15:
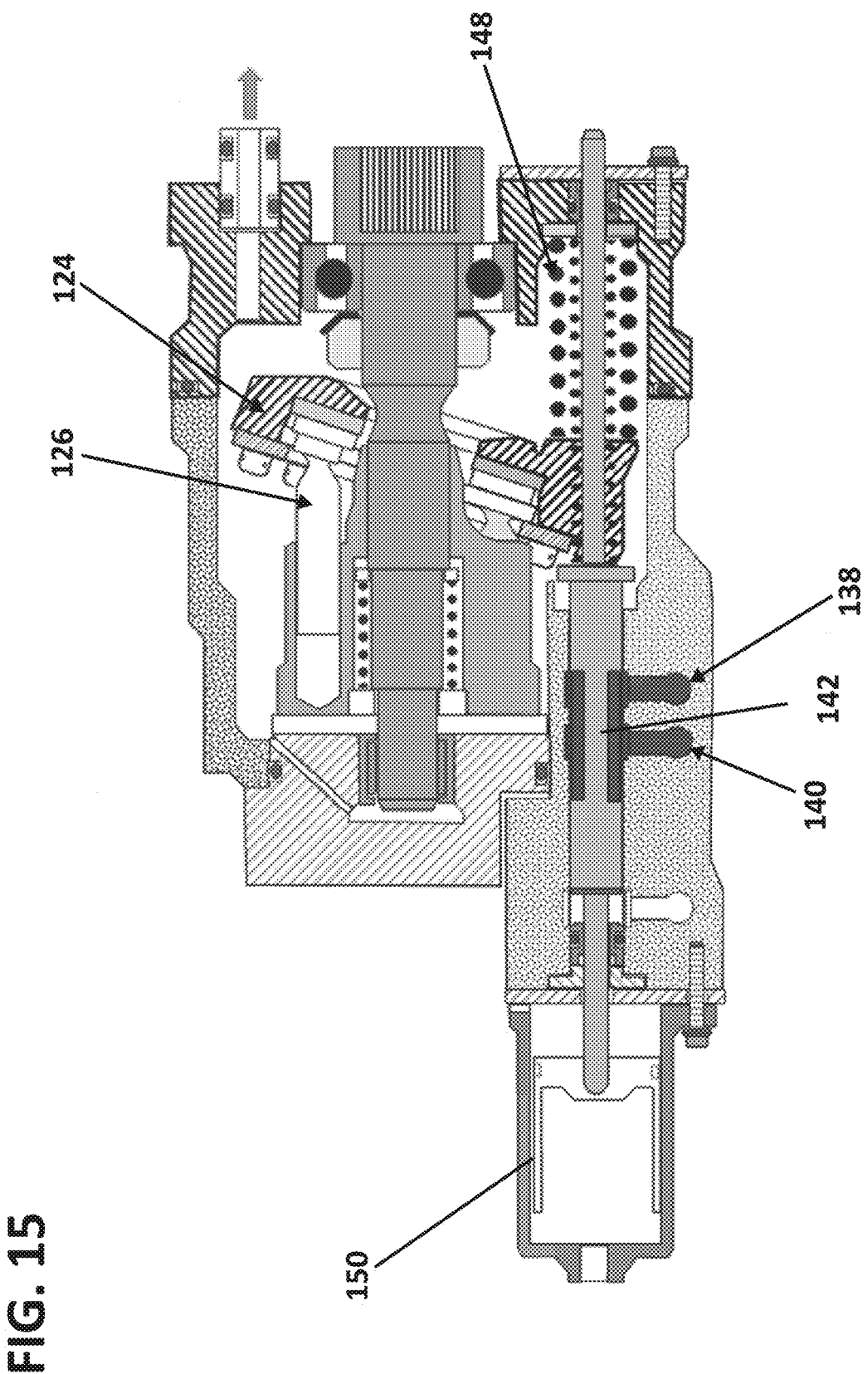
FIG. 15 shows the control valve unit of FIG. 14 at a beginning of the non-restrictive operating state.

FIGS. 14 and 15 provide a more detailed illustration of the control unit 114 and hydraulic motor 106 of FIGS. 3-5. FIG. 14 shows the control unit 114 disposed in a restrictive flow state. The land 144 of the spool 134 is blocking a majority of the supply port 138 to limit the flow from the supply port 138 reaching the motor port 140. The spool 134 is shown spaced from the swash plate 124 so that the spring 148 biases the swash plate 124 to the maximum displacement position. FIG. 15 shows the control unit 114 disposed in a non-restrictive flow state. The groove 142 aligns with both the supply port 138 and the motor port 140, thereby creating an unrestrictive fluid path therebetween. The spool 134 has translated within the spool bore sufficient to contact the swash plate 124, but not enough to counter the bias of the spring 148. As pressure from the pump outlet 112 increases, the pressure piston 150 will continue to move the spool 134 against the swash plate 124 to displace the swash plate 124 against the bias of the spring 148 towards a zero displacement position.

Figure 7:
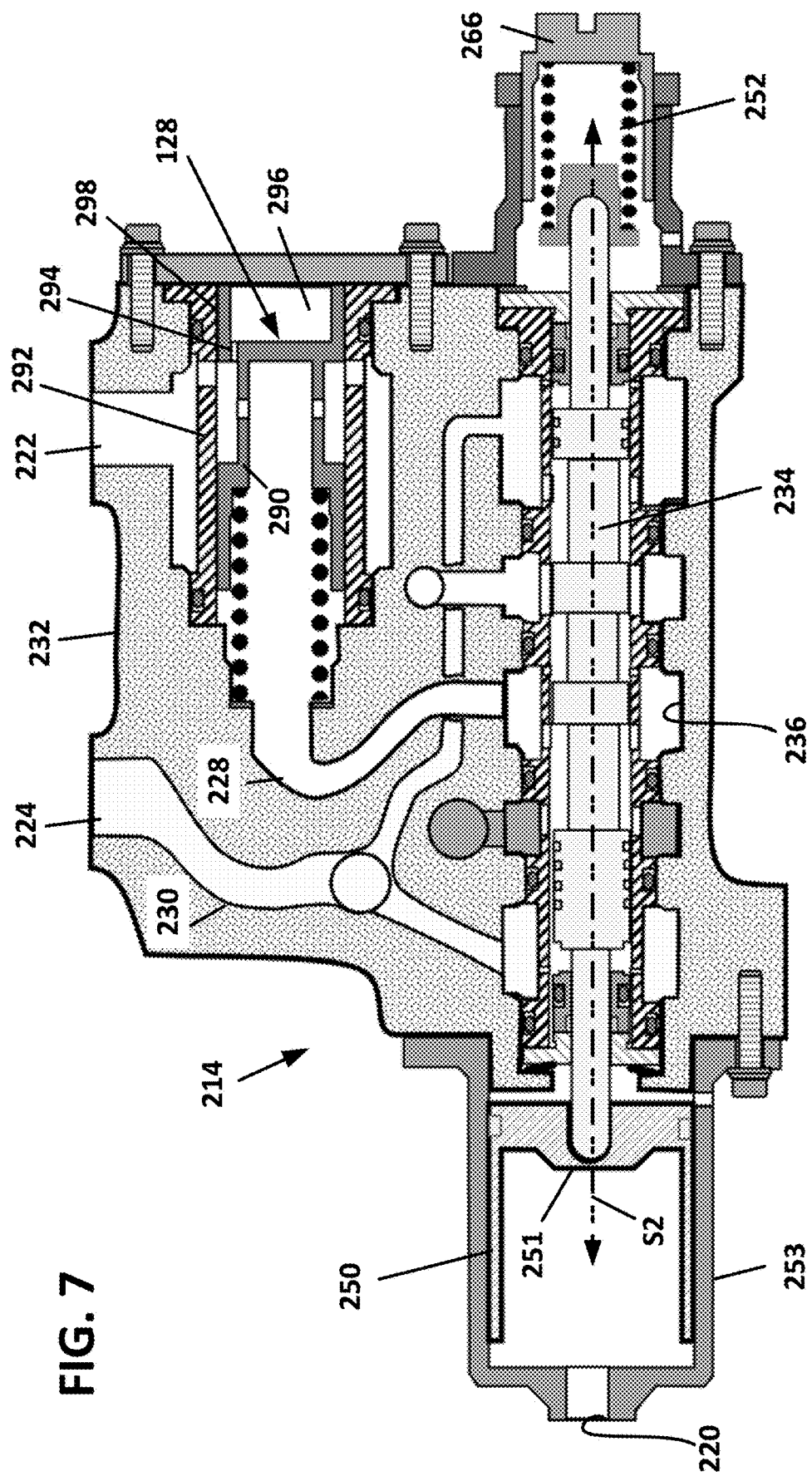
FIG. 7 illustrates a second example implementation of the hydraulic motor and control valve unit of FIG. 1 disposed in a non-restrictive operating state.
Figure 8:
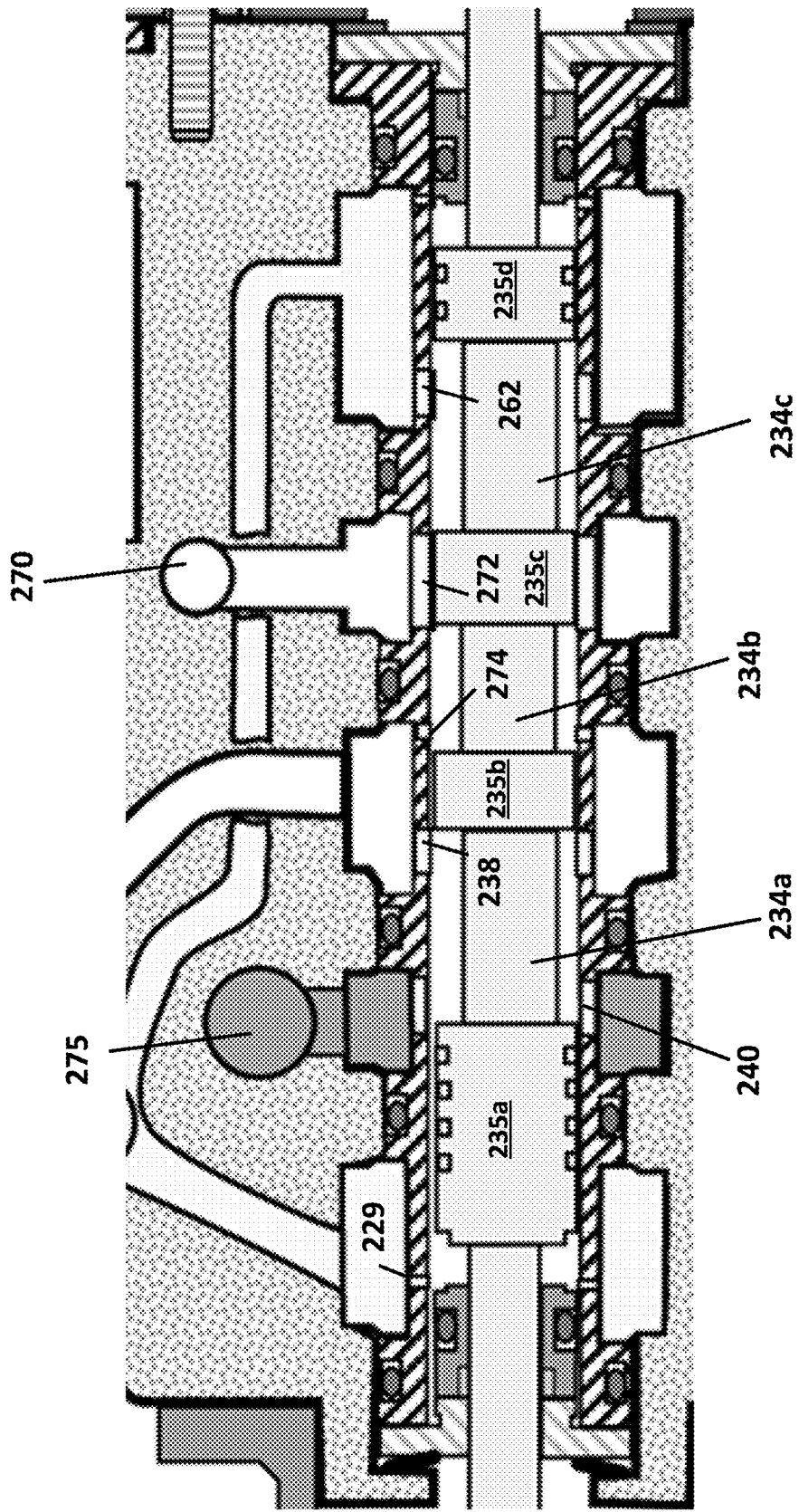
FIG. 8 is an enlarged view of a portion of FIG. 7.
Figure 9:
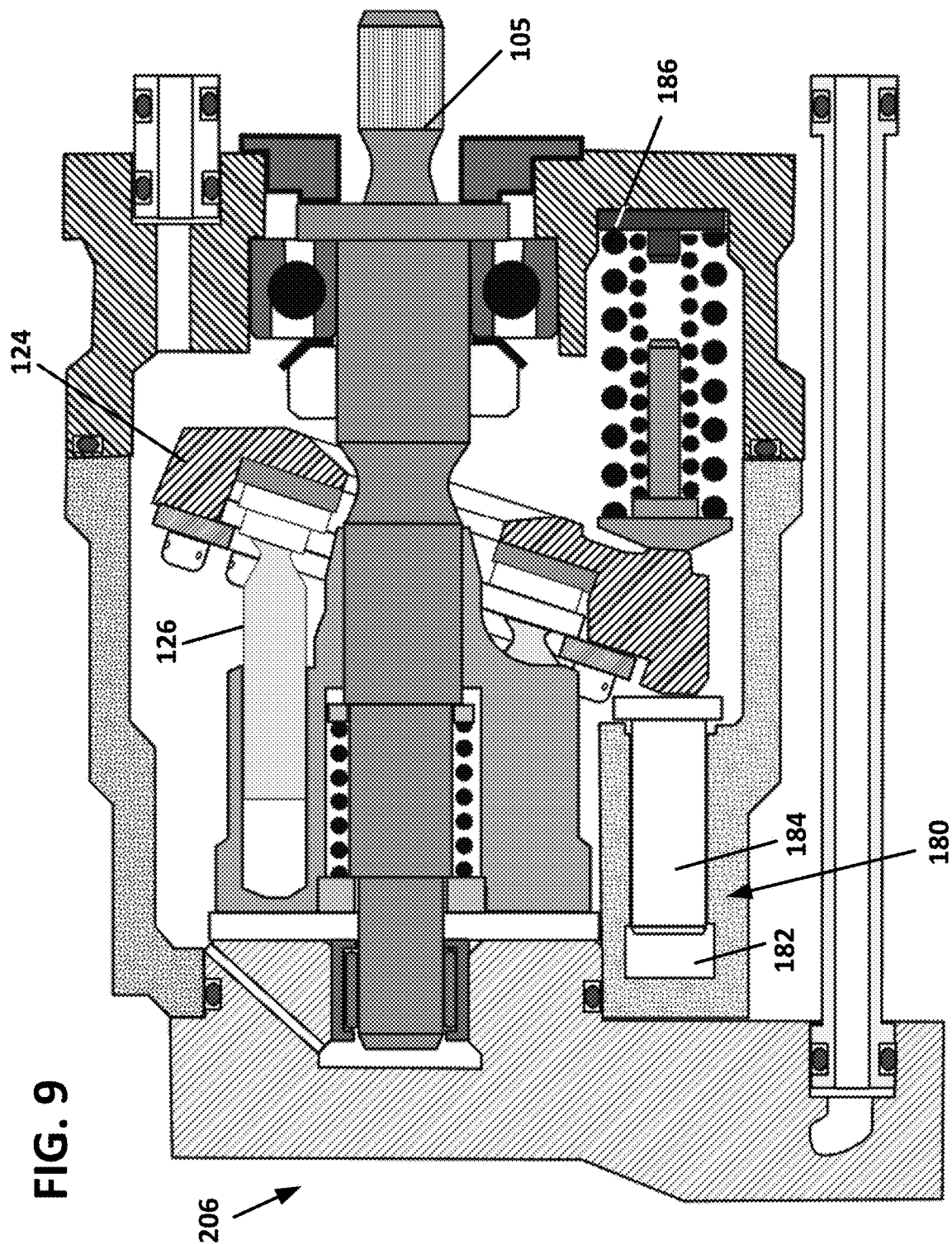
FIG. 9 illustrates a second example implementation of a motor that receives hydraulic fluid flow from the control unit of FIG. 7.

FIGS. 7-11 illustrate a second example implementation of the control unit 214 to manage displacement of the swash plate 124 and/or the fluid supply to the rotating group 126 of a second example implementation of a hydraulic motor 206 (FIG. 9). The control unit 214 is configured to hydraulically control the swash plate 124 in addition to the amount of fluid provided to the rotating group 126.

The valve body 232 of the control unit 214 defines a hydraulic system inlet 222, a hydraulic system outlet 224, and a fuel pressure inlet 220. The valve body 232 defines a first fluid passage 228 from the hydraulic system inlet 222 to the spool bore 236 and a second fluid passage 230 from the hydraulic system outlet 224 to the spool bore 236. As shown in FIGS. 7 and 8, the first fluid passage 228 leads to a hydraulic fluid supply inlet port 238. The second fluid passage 230 branches to a first low pressure port 229 and a second low pressure port 262.

In certain implementations, the valve body 232 also defines a control passage 270 leading from a spool bore port 272 to a control piston and cylinder arrangement 180 at the swash plate 124 (e.g., see FIG. 9). Providing hydraulic fluid to the control piston and cylinder arrangement 180 counteracts the bias of a spring 186 to move the swash plate 124 towards a zero displacement position (see FIG. 9). The control unit body 220 also defines a motor passage 275 leading from a spool bore port 240 to the motor rotating group 126.

Referring to FIG. 7, in certain implementations, a hydraulic flow limiter 128 is disposed along the first fluid passage 228 between the hydraulic system inlet 222 and the spool bore 236. The hydraulic flow limiter 128 includes a spring-biased piston 290 within a cylinder 292. A channel 294 leads from the cylinder 292 to a chamber 296 adjacent the piston 290. Hydraulic fluid passes through orifices in the cylinder 292 and piston 290 to reach the first fluid passage 228. When sufficient hydraulic fluid is flowing, the hydraulic fluid passes through the channel 294 to the chamber 296. When sufficient hydraulic fluid fills the chamber 296, the fluid opposes the spring bias to move the piston 290 so that a surface 298 restricts an orifice leading into the cylinder 292. Accordingly, the hydraulic flow limiter 228 regulates the amount of hydraulic fluid that can enter the spool bore 236 and pass to the motor passage 275. In other implementations, the flow limiter 128 may be disposed external of the valve body 232 of the control unit 214 upstream of the hydraulic system inlet 222.

On occasion, the hydraulic flow limiter 128 can fail by becoming stuck in one position (e.g., through silting). For example, the hydraulic flow limiter 128 becomes stuck in the open position, which does not restrict hydraulic fluid flow into the first fluid passage 228. Accordingly, in some implementations, the control unit 214 provides a redundant safeguard to restrict how much fluid can be supplied to the rotating group 126 of the motor 206. The spool 234 is configured to provide this redundant safeguard. In other implementations, the spool 234 functions as the primary or sole mechanism for restricting fluid flow to the motor 206.

Figure 11:
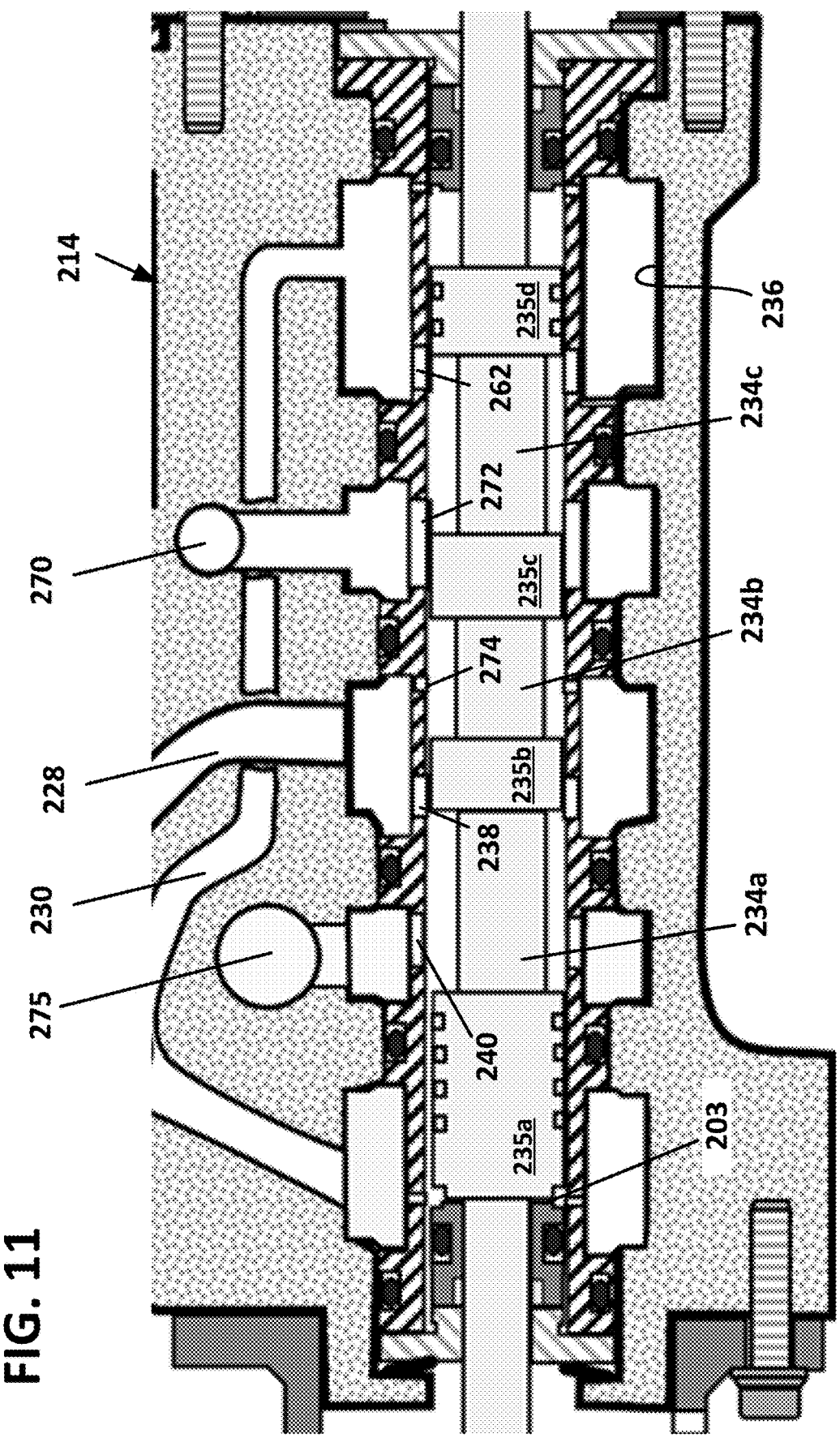
FIG. 11 shows the spool of FIG. 8 configured in a restrictive operating state where fluid from the return line is flowing to the swash plate controls in the motor.

As discussed above, the spool 234 moves along a range of travel between the non-restrictive operating state (e.g., see FIG. 10) and the non-restrictive operating state (e.g., see FIG. 11). The spool 234 includes multiple grooves 234a, 234b, 234c disposed between multiple lands 235a, 235b, 235c, 235d. When the spool 234 is disposed in one non-restrictive operating state (e.g., see FIGS. 7 and 8), the first groove 234a aligns with the hydraulic fluid supply inlet port 238 and the motor supply outlet port 240, thereby allowing fluid to flow therebetween. In certain implementations, the third land 235c aligns substantially or fully with the port 272 to the control passage 270. In such implementations, the swash plate 124 is retained at its maximum displacement by the spring 186.

When the spool 234 is disposed in another position within the non-restrictive operating state (e.g., see FIG. 10), which occurs when a pump output pressure exceeds the predetermined threshold, the first groove 234a still aligns with the hydraulic fluid supply inlet 238 and the motor supply outlet 240, thereby allowing fluid to flow therebetween. In some examples, neither of the lands 235a, 235b block the hydraulic fluid supply inlet port 238 and the motor supply outlet port 240. In other examples, one or both the ports 238, 240 are partially blocked, but not to the extent of the restrictive operation condition of the control unit 214. The groove 234b aligns with another port 274 from the first fluid passage 228 and the spool bore port 272 for the control passage 270. Accordingly, high pressure fluid is supplied to the control piston and cylinder arrangement 180 to overcome the bias of the spring 186 and move the swash plate 124 to the zero displacement position.

When the spool 234 is disposed in the restrictive operating state (e.g., see FIG. 11), which occurs when a pump output pressure drops below a predetermined threshold needed to balance the spring 252, the first groove 234a does not fully align with the hydraulic fluid supply inlet port 238. Rather, the second land 235b extends across a majority of the supply inlet port 238, thereby allowing restrictive fluid flow between the hydraulic fluid supply inlet port 238 and the motor supply outlet port 240 through the restrictive area. In other examples, the first groove 234a does not align with the hydraulic fluid supply inlet 238, but rather aligns with a separate hydraulic fluid supply port (now shown) that is smaller than the supply inlet 238. Accordingly, restrictive flow can pass between the separate support port and the motor supply outlet 240.

The third land 235c blocks fluid flow between the supply inlet port 238 and the control port 272 while the third groove 234c fluidly couples the control port 272 to the second low pressure port 262. In certain implementations, the low pressure provided from the port 262 is not sufficient to overcome the bias of the spring 186. Accordingly, the swash plate 124 remains at a displaced position largely or fully controlled by the force of the spring 186.

In certain implementations, the first land 235a of the spool 234 abuts a positive stop 203 defined within the spool bore 236 to inhibit movement of the spool 234 under the bias of the spring 252 beyond the restrictive position (even in the absence of fuel pressure). The positive stop 203 also prevents the spool 234 from moving to a position where the second land 235b fully blocks the supply inlet port 238. Hydraulic fluid can flow to the motor 206 through the restrictive area even when the spool 234 is disposed in the restrictive position. Providing at least some fluid flow to the motor outlet 240 (or a separate motor outlet) allows the control unit 214 to initially start the motor 206 with the spool valve 234 in the restrictive position. Further, the restrictive flow area is large enough to allow the hydraulic motor 206 to be re-started after an event in which fluid flow to the fluid supply port 238 stops.

Figure 12:
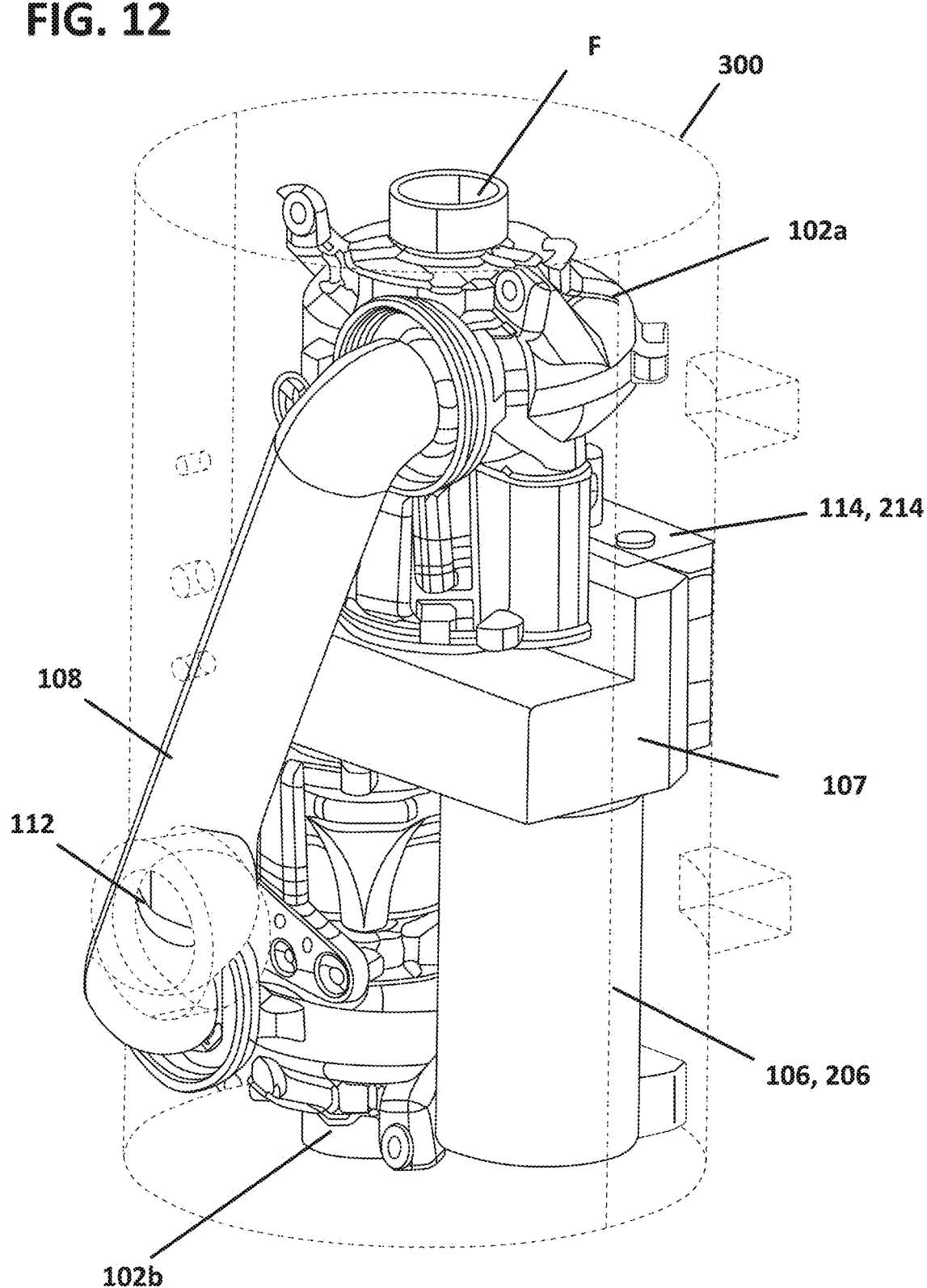
FIG. 12 is a perspective view of an example packaging for the hydraulic motor driven fuel boost pump of FIG. 1.
Figure 13:
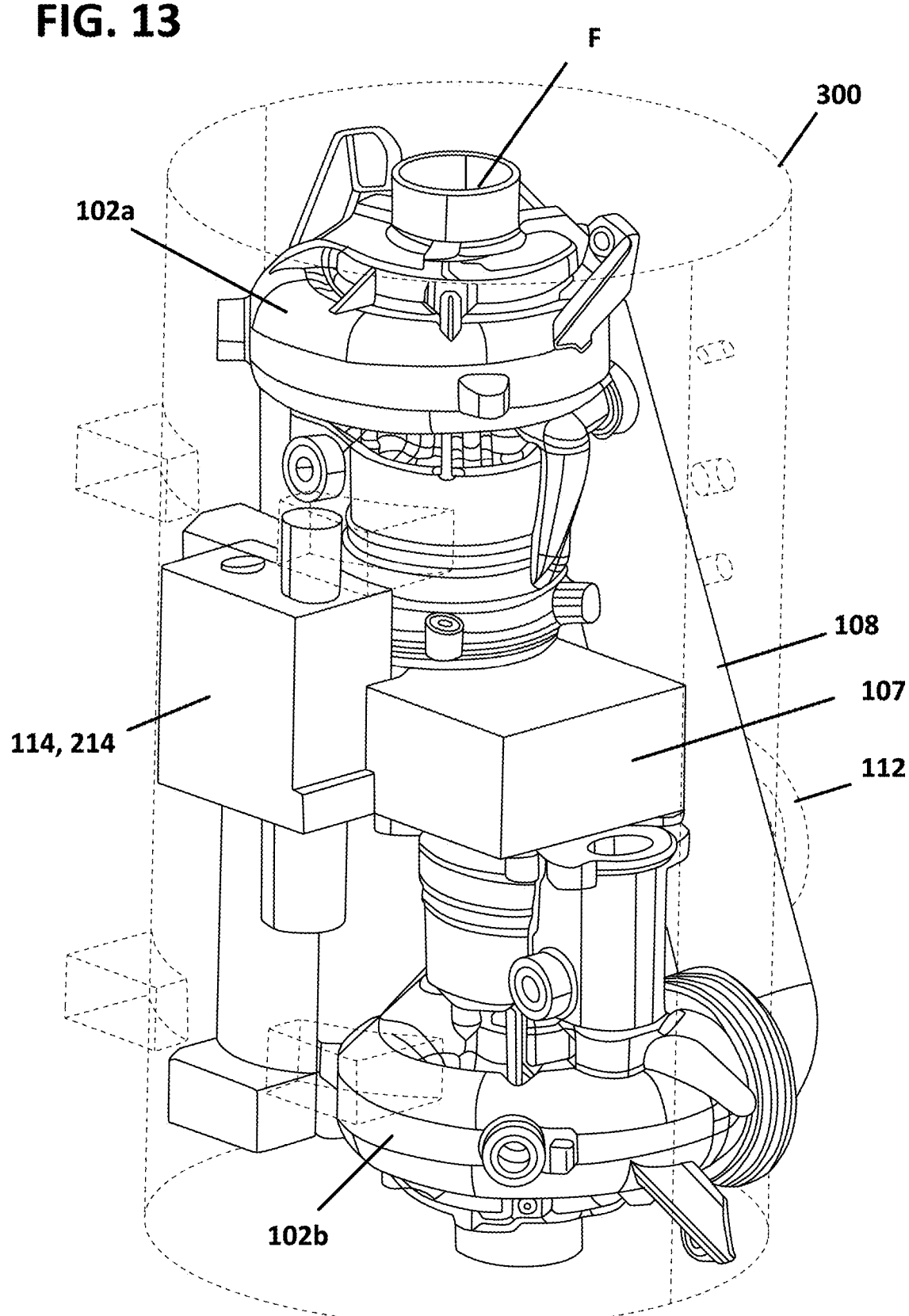
FIG. 13 is another perspective view of the packaging of FIG. 12.

Referring to FIGS. 12-13, the pump arrangement 102, the hydraulic motor 106, 206, and the control unit 114, 214 can be packaged together within a housing 300.

In the example shown, the pump arrangement 102 includes a first pump 102a at a first end of the housing 300 and a second pump 102b at a second end of the housing 300. A manifold 108 connects the outputs of the pumps 102a, 102b and directs them to a pump outlet 112. A gearbox 107 connects the hydraulic motor 106, 206 to the pumps 102a, 102b.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A hydraulic system comprising:
a pump including an inlet and an outlet;
a hydraulic motor for driving the pump;
a control valve including a valve body defining a spool bore, the valve body defining a fluid supply port and a fluid outlet port both in fluid communication with the spool bore, the fluid supply port being adapted to be connected to a fluid supply, and the fluid outlet port being fluidly connected to the hydraulic motor to provide fluid for driving rotation of a rotating group of the hydraulic motor, the control valve including a spool positioned within the spool bore, the spool having a first end and an opposite second end, the spool being linearly moveable within the spool bore along an axis of the spool bore to move the control valve between a first operating state and a second operating state, the spool being configured to open a non-restrictive flow path within the spool bore between the fluid supply port and the fluid outlet port when the control valve is in the first operating state, the control valve defining a restrictive flow area through which hydraulic fluid from the fluid supply port is required to pass to reach the fluid outlet port when the control valve is in the second operating state, the control valve including a piston chamber at the first end of the spool and an outlet pressure piston within the piston chamber that is acted on by an outlet pressure from the pump to move the spool along the axis of the spool bore in a first direction away from the piston chamber, the control valve including a spring at the second end of the spool to apply a bias to the spool along the axis of the spool bore in a second direction that is opposite from the first direction, the spring providing a spring force that corresponds to a normal operating pressure desired at the outlet of the pump, wherein, when the outlet pressure of the pump is at the normal operating pressure or above the normal operating pressure, the outlet pressure piston moves the spool in the first direction along the axis of the spool bore against the bias of the spring to a first position or positions corresponding to the first operating state, and wherein, when the outlet pressure of the pump is below the normal operating pressure, the spring moves the spool in the second direction along the axis of the spool bore to a second position corresponding to the second operating state, wherein the control valve is not capable of reducing fluid communication between the fluid supply port and the fluid outlet port to a flow area that is smaller than the restrictive flow area.

2. The hydraulic system of claim 1, wherein the control valve includes a positive stop for stopping an axial movement of the spool in the second direction at the second position.

3. The hydraulic system of claim 2, wherein the spool includes a land that cooperates with the valve body to define the restrictive flow area when the spool is in the second position.

4. The hydraulic system of claim 3, wherein when the spool is in the first position or positions the fluid supply port is fully open and not blocked by the land such that a full area of the fluid supply port is available to provide flow from the fluid supply port to the fluid outlet port, and wherein when the spool is in the second position the land blocks a majority of the fluid supply port such that only the restrictive flow area is available to provide flow from the fluid supply port to the fluid outlet port.

5. The hydraulic system of claim 1, wherein the hydraulic motor is a variable displacement hydraulic motor, and wherein a size of the restrictive flow area is selected based both on the normal operating pressure of the fluid supply and an amount of pressure drop across the restrictive flow area to provide the hydraulic motor with a limited motor drive pressure suitable for driving the hydraulic motor at a safe speed even when the pump is running dry.

6. The hydraulic system of claim 1, wherein the restrictive flow area is large enough to allow the hydraulic motor to be re-started after an event in which fluid flow to the fluid supply port stops.

7. The hydraulic system of claim 1, wherein the pump is a fuel pump.

8. The hydraulic system of claim 1, wherein the control valve includes a flow limiter valve positioned with the valve body at a location along the fluid supply port upstream of the spool bore.

9. The hydraulic system of claim 1, wherein the hydraulic motor includes a swash plate for varying displacement of the hydraulic motor, and wherein when the outlet pressure of the pump exceeds the normal operating pressure the outlet pressure piston moves the spool in the first direction towards a position in which the spool is operatively coupled to the swash plate such that movement of the spool in the first direction mechanically causes a movement of the swash plate to destroke the hydraulic motor.

10. The hydraulic system of claim 1, wherein the hydraulic motor includes a swash plate for varying displacement of the hydraulic motor, and wherein when the outlet pressure of the pump exceeds the normal operating pressure the outlet pressure piston moves the spool in the first direction to towards a position in which the spool is operatively coupled to the swash plate such that movement of the spool in the first direction mechanically causes movement of the swash plate to destroke the hydraulic motor.

11. The hydraulic system of claim 1, wherein the valve body includes a second supply inlet.

12. The hydraulic system of claim 11, wherein the second supply inlet is smaller than the fluid supply port.

13. The hydraulic system of claim 11, wherein the second supply inlet is sized to allow a restrictive amount of hydraulic fluid to pass the fluid outlet port.

14. The hydraulic system of claim 11, wherein the spool is configured to block the fluid supply port without blocking the second supply inlet.

15. The hydraulic system of claim 1, wherein the valve body includes a second outlet configured to be smaller than the fluid outlet port.

16. The hydraulic system of claim 15, wherein the spool is configured to block the fluid outlet port without blocking the second outlet.

17. The hydraulic system of claim 1, wherein the valve body includes a return outlet configured to draw the fluid into the spool bore after the fluid pass the fluid outlet port.

18. A hydraulic system comprising:
a pump including an inlet and an outlet;
a hydraulic motor for driving the pump;
a control valve including a valve body defining a spool bore, the valve body defining a fluid supply port and a fluid outlet port both in fluid communication with the spool bore, the fluid supply port being adapted to be connected to a fluid supply, and the fluid outlet port being fluidly connected to the hydraulic motor to provide fluid for driving rotation of a rotating group of the hydraulic motor, the control valve including a spool positioned within the spool bore, the spool having a first end and an opposite second end, the spool being linearly moveable within the spool bore along an axis of the spool bore to move the control valve between a first operating state and a second operating state, the spool being configured to open a non-restrictive flow path within the spool bore between the fluid supply port and the fluid outlet port when the control valve is in the first operating state, the control valve defining a restrictive flow area through which hydraulic fluid from the fluid supply port is required to pass to reach the fluid outlet port when the control valve is in the second operating state, the control valve including a piston chamber at the first end of the spool and an outlet pressure piston within the piston chamber that is acted on by an outlet pressure from the pump to move the spool along the axis of the spool bore in a first direction away from the piston chamber, the control valve including a spring at the second end of the spool to apply a bias to the spool along the axis of the spool bore in a second direction that is opposite from the first direction, the spring providing a spring force that corresponds to a normal operating pressure desired at the outlet of the pump, wherein, when the outlet pressure of the pump is at the normal operating pressure or above the normal operating pressure, the outlet pressure piston moves the spool in the first direction along the axis of the spool bore against the bias of the spring to a first position or positions corresponding to the first operating state, and wherein when the outlet pressure of the pump is below the normal operating pressure the spring moves the spool in the second direction along the axis of the spool bore to a second position corresponding to the second operating state;
wherein the valve body defines a motor control port for providing pressure to a control piston for moving a swash plate to destroke the hydraulic motor, wherein, when the outlet pressure of the pump exceeds the normal operating pressure, the outlet pressure piston moves the spool in the first direction towards a position in which the motor control port is in fluid communication with the fluid supply port.

19. A hydraulic system comprising:
a pump including an inlet and an outlet;
a hydraulic motor for driving the pump;
a control valve including a valve body defining a spool bore, the valve body defining a fluid supply port and a fluid outlet port both in fluid communication with the spool bore, the fluid supply port being adapted to be connected to a fluid supply, and the fluid outlet port being fluidly connected to the hydraulic motor to provide fluid for driving rotation of a rotating group of the hydraulic motor, the control valve including a spool positioned within the spool bore, the spool having a first end and an opposite second end, the spool being linearly moveable within the spool bore along an axis of the spool bore to transition the control valve between a first operating state and a second operating state, the control valve defining a flow path between the fluid supply port and the fluid outlet port, the flow path being non-restrictive when the control valve is in the first operating state, the flow path being restrictive when the control valve is in the second operating state, the control valve including a spool actuation piston that is operatively coupled to the first end of the spool for forcing the spool in a first direction along the axis of the spool bore in response to a pressure that corresponds to the outlet of the pump and that is being applied to the spool actuation piston, the control valve also including a spring operatively coupled to the second end of the spool for biasing the spool along the axis of the spool bore in a second direction opposite from the first direction, wherein the control valve transitions between the first and second operating states based on a direction of a net force applied to the spool by the spool actuation piston and the spring;
wherein when the control valve is in the second operating state, the flow path defines a flow restriction area that is small enough to provide a restriction of flow to the hydraulic motor to prevent the hydraulic motor from an unsafe speed when the pump is spinning dry, and is large enough such that at start-up under non-dry pump conditions enough pressure and flow are provided to the hydraulic motor from the control valve to drive the pump at a speed which causes sufficient outlet pressure at the pump to cause the control valve to transition from the second operating state toward the first operating state.

20. The hydraulic system of claim 19, wherein the control valve includes a stop for stopping movement of the spool in the second direction at a restrictive flow position corresponding to the second operating state of the control valve, and wherein the spool is moveable between a plurality of positions while the control valve is in the first operating state.

21. The hydraulic system of claim 20, wherein a displacement of the hydraulic motor is variable, the displacement being based on a position of the spool within the spool bore while the control valve is in the first operating state.

22. The hydraulic system of claim 19, wherein the pump is a fuel pump.

23. A hydraulic system comprising:
   a pump including an inlet and an outlet;
   a hydraulic motor for driving the pump;
   a control valve including a valve body defining a spool bore, the valve body defining a fluid supply port and a fluid outlet port both in fluid communication with the spool bore, the fluid supply port being adapted to be connected to a fluid supply, and the fluid outlet port being fluidly connected to the hydraulic motor to provide fluid for driving rotation of a rotating group of the hydraulic motor, the control valve including a spool positioned within the spool bore, the spool having a first end and an opposite second end, the spool being linearly moveable within the spool bore along an axis of the spool bore to transition the control valve between a first operating state and a second operating state, the control valve defining a flow path between the fluid supply port and the fluid outlet port, the flow path being non-restrictive when the control valve is in the first operating state, the flow path being restrictive when the control valve is in the second operating state, the control valve including a spool actuation piston that is operatively coupled to the first end of the spool for forcing the spool in a first direction along the axis of the spool bore in response to a pressure that corresponds to the outlet of the pump and that is being applied to the spool actuation piston, the control valve also including a spring operatively coupled to the second end of the spool for biasing the spool along the axis of the spool bore in a second direction opposite from the first direction, wherein the control valve transitions between the first and second operating states based on a direction of a net force applied to the spool by the spool actuation piston and the spring; and
   a flow limiting valve integrated into the valve body at the fluid supply port, wherein a flow restriction of the flow path when the control valve is in the second operating state is less restrictive than the flow limiting valve when operating at comparable flows and pressures.

\* \* \* \* \*